No. 786,981. PATENTED APR. 11, 1905.
R. G. McAULEY.
STEAM TRAP.
APPLICATION FILED MAR. 31, 1904.

3 SHEETS—SHEET 1.

Witnesses:
E. V. Mackenzie,
Chas Shipley

Inventor:
Robert G. McAuley
by C. M. Clarke
his attorney

No. 786,981. PATENTED APR. 11, 1905.
R. G. McAULEY.
STEAM TRAP.
APPLICATION FILED MAR. 31, 1904.
3 SHEETS—SHEET 2.
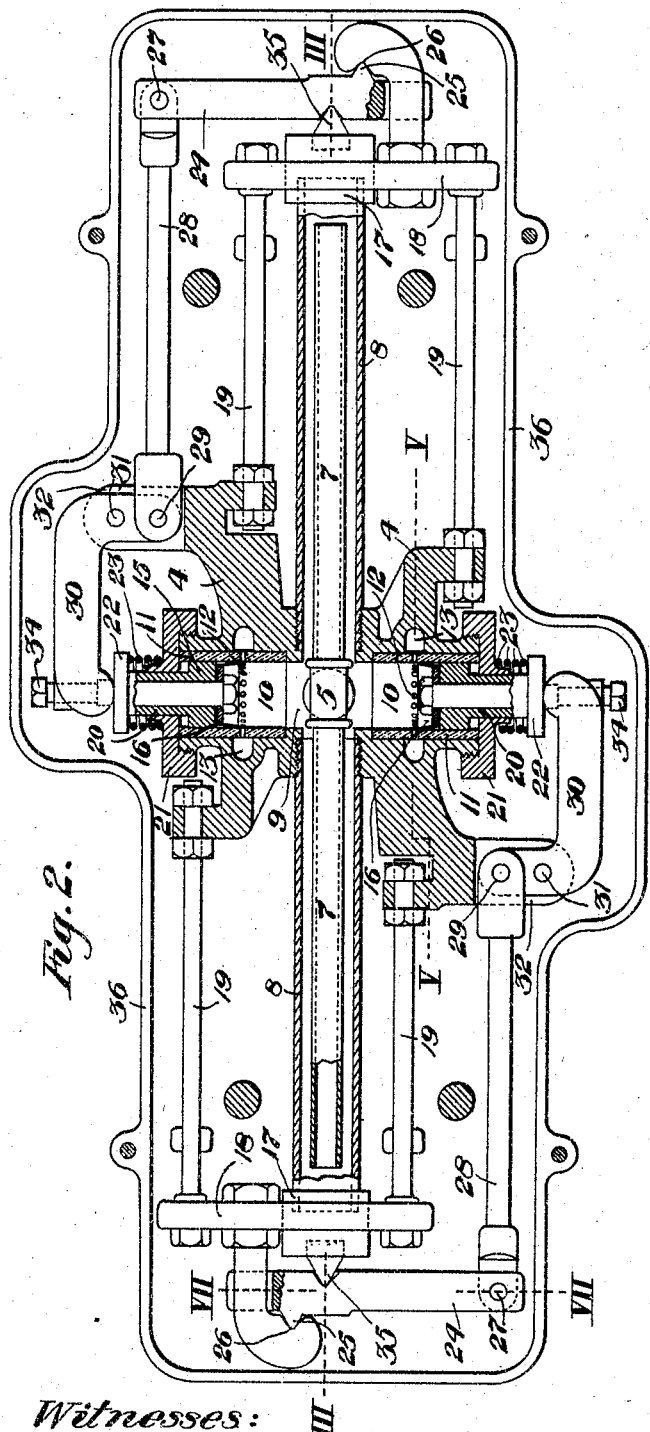
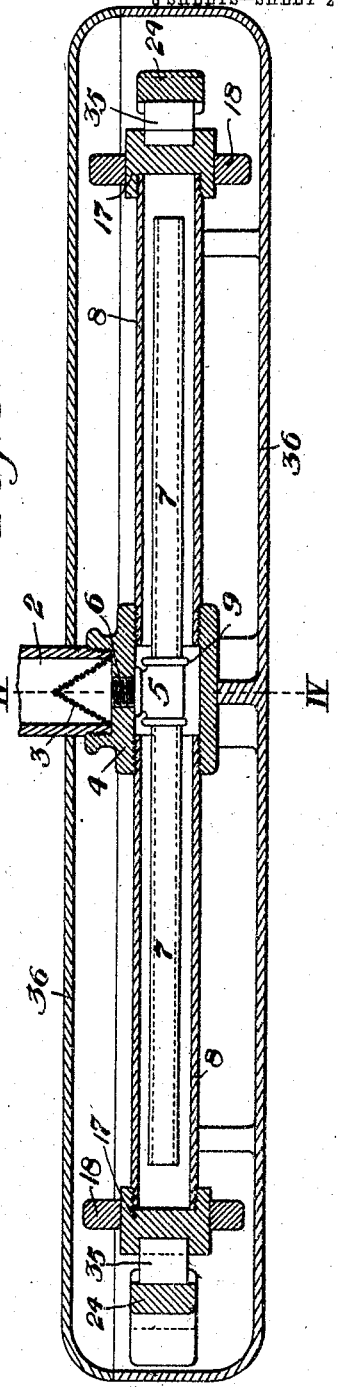
Witnesses:
E. V. MacKenzie
Chas. S. Lepley
Inventor:
Robert G. McAuley
by O. M. Clarke
his attorney No. 786,981. PATENTED APR. 11, 1905.
R. G. McAULEY.
STEAM TRAP.
APPLICATION FILED MAR. 31, 1904.

3 SHEETS—SHEET 3.

Witnesses:
E. V. MacKenzie
Chas. S. Sepley

Inventor:
Robert G. McAuley
by O. M. Clarke
his attorney

No. 786,981. Patented April 11, 1905.

UNITED STATES PATENT OFFICE.

ROBERT G. McAULEY, OF PITTSBURG, PENNSYLVANIA.

STEAM-TRAP.

SPECIFICATION forming part of Letters Patent No. 786,981, dated April 11, 1905.

Application filed March 31, 1904. Serial No. 200,892.

*To all whom it may concern:*

Be it known that I, ROBERT G. MCAULEY, a citizen of the United States, residing at Pittsburg, in the county of Allegheny and State of Pennsylvania, have invented certain new and useful Improvements in Steam-Traps, of which the following is a specification, reference being had therein to the accompanying drawings, forming part of this specification, in which—

Figure 1:
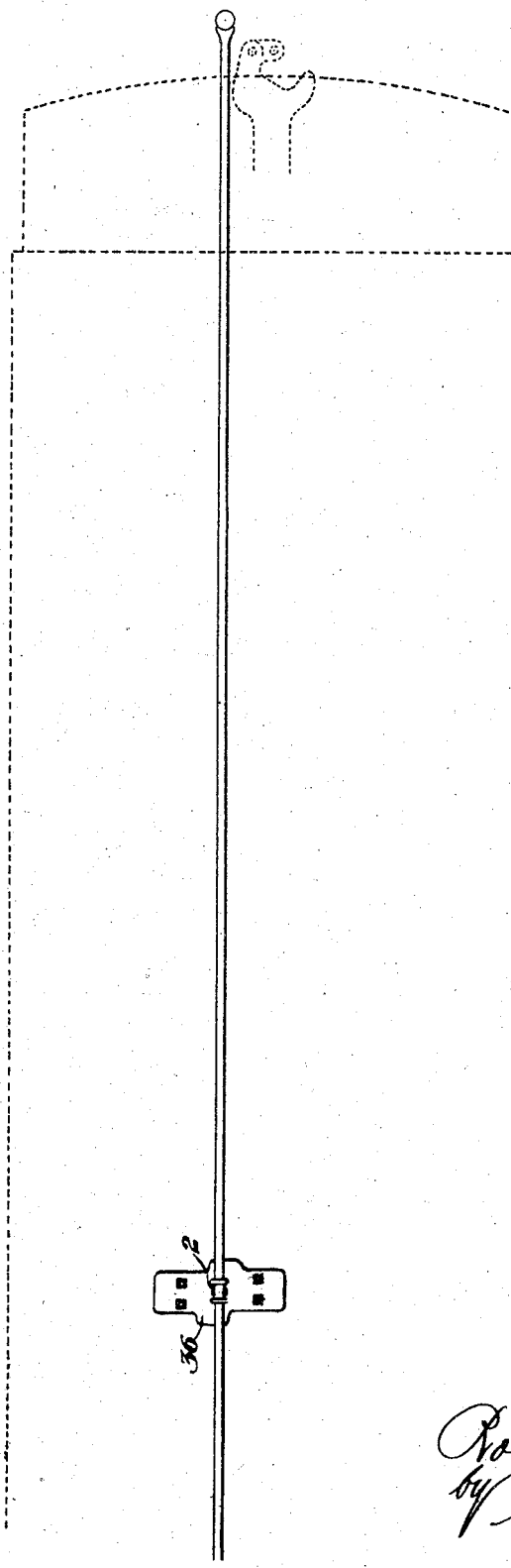
Figure 4:
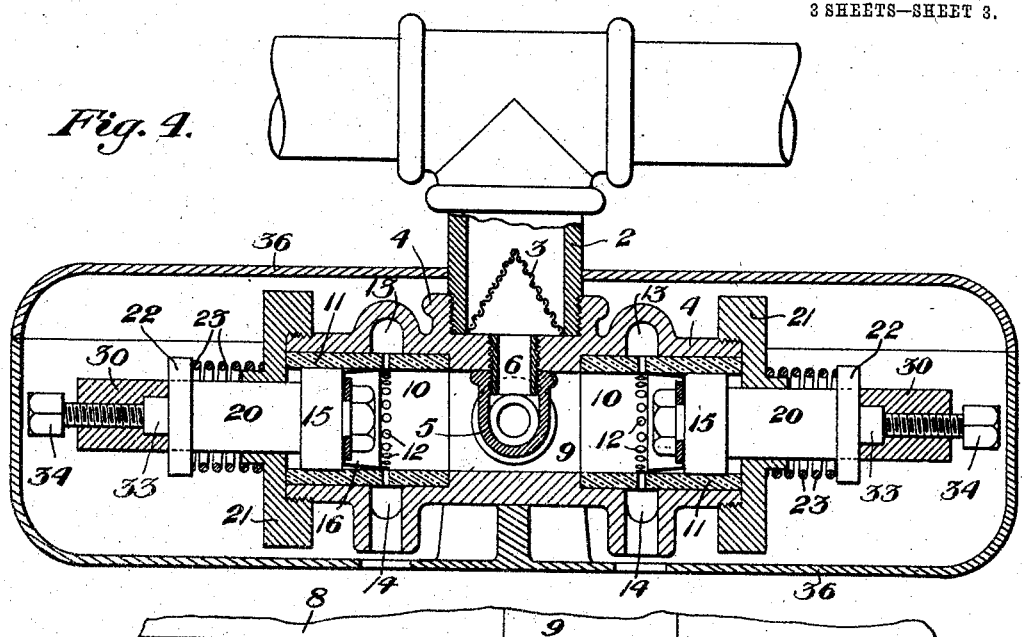
Figure 6:
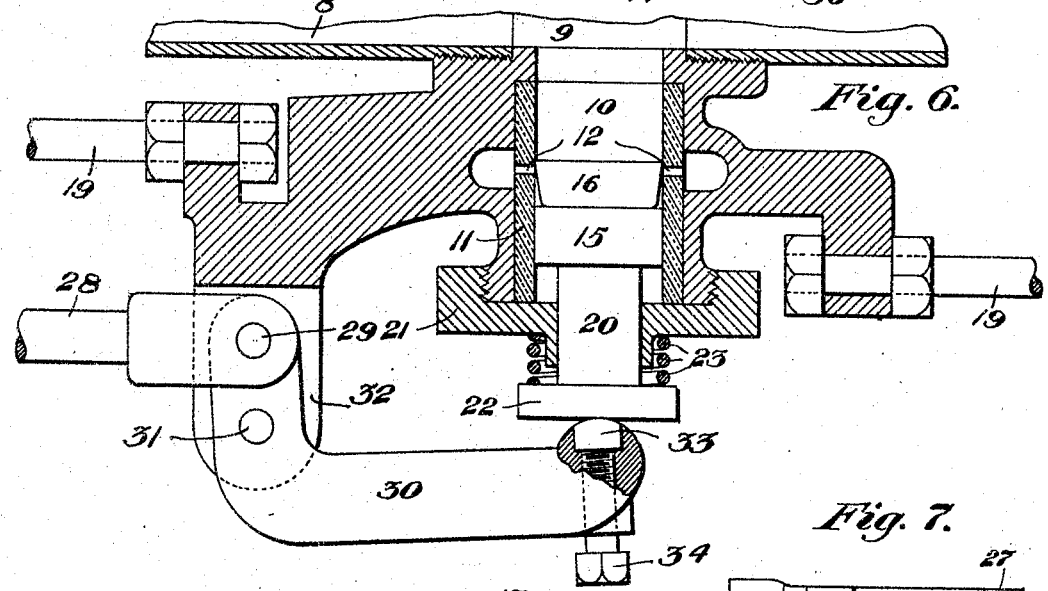
Figure 7:
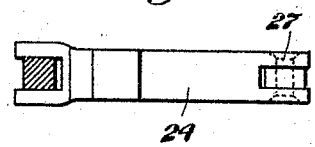
Figure 5:
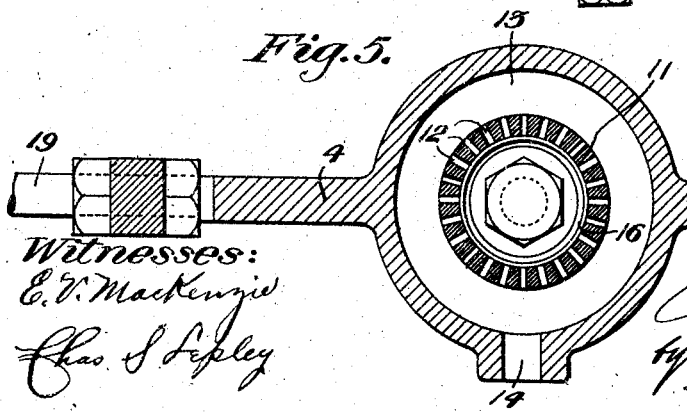

Figure 1 is a plan view of a car, showing my improved trap applied thereto and connected with the pipes of the steam-heating system. Fig. 2 is a central horizontal sectional view thereof on an enlarged scale. Fig. 3 is a central vertical sectional view indicated by the line III III of Fig. 2. Fig. 4 is a cross-section indicated by the line IV IV of Fig. 3. Fig. 5 is a sectional view indicated by the line V V of Fig. 2. Fig. 6 is a partial sectional view similar to Fig. 2, showing the plunger extended inwardly to cover the exhaust-ports. Fig. 7 is a detailed sectional view indicated by the line VII VII of Fig. 2.

My invention refers to an improved apparatus for collecting and eliminating water of condensation, and is particularly designed for the purpose of being used in connection with the steam-supply pipes of a car-heating system or any other similar heating or steam-conveying plant where the water of condensation must be disposed of. The device is designed for the purpose of operating automatically depending on variations in temperature caused by the varying temperature of the steam and water, respectively.

Referring to the drawings, 2 is an inlet-pipe connected with the steam-pipe of the system, provided with a wire-gauze 3 or other suitable straining device adapted to intercept any foreign substances.

4 is a casting forming the main body portion of the trap with which the pipe 2 is connected, as shown in Fig. 4.

5 is a T-joint connected by nipple 6, tapped through the shell of the case 4 and communicating with inlet-pipe 2.

7 7 are oppositely-disposed pipes extending outwardly from the T connection 5 and terminating at or about the outer extremity of surrounding tubes 8, tapped at their inner ends in the main case 4.

The main case is provided with an internal cavity 9, with which the interiors of tubes 8 communicate, as do also the plunger-cylinders 10. These cylinders 10 are composed of bushings 11, inserted in the main casing and located transversely of the apparatus on opposite ends of its longitudinal center and on the same horizontal planes as its longitudinal center. The bushings are each provided with a series of escape-ports 12, communicating outwardly with common annular exhaust-ports 13, each of which is provided at its lower side with a drain-opening 14.

15 15 are the plungers mounted in cylinders 11 and provided with packidg-cups 16, of brass or other metal, secured to the plunger in any suitable manner, as by a central tap-bolt or a stud or nut, as shown, preferably with an intervening washer by which the gasket 16 may be clamped down upon the head.

The pipes 8, which are preferably made of brass, are subject to variations in their length in the manner of a thermostat and are each provided at their outer ends with cylindrical guiding and closing heads 17, also of brass or other non-corrosive material, slidingly mounted in cross-heads 18. These cross-heads are rigidly connected with the main casting or framework 4 by means of bolts 19, as clearly shown in Fig. 2.

The necks 20 of the plungers extend outwardly from the cylinders 11 through caps 21, in which they have suitable bearings, and are each provided with collars 22 at their outer ends, a coiled spring 23 being interposed between the cap and the collar and adapted to assist in throwing the plunger outwardly to uncover exhaust-ports 12.

For the purpose of closing the ports 12 when the trap is empty of water I have designed a system of levers adapted to transmit movement to the plunger upon longitudinal expansion of tubes 8, due to their increase in temperature upon being filled by live steam.

24 is a lever having a knife-edge bearing projection 25, resting in grooved bearing 26 in cross-head 18 at each end. The lever 24 extends outwardly and is connected at 27 with a connecting-rod 28, attached at its end, as at 29, to the inner end of a bell-crank lever 30, pivoted at 31 in a suitable bearing 32, projecting outwardly and forming a part of the main casting. The long arm of bell-crank lever 30 projects over and rests against the end of plunger-neck 20, being preferably provided with an adjusting bearing-point 33 at the inner end of an adjusting set-screw 34. The head 17 of tube 8 is also provided with a bearing projection 35, engaging lever 24, and it will be observed that the bearing-point of the terminal 35 is comparatively close to the bearing 25 of lever 24, thereby producing an increased range of movement at the outer end of the lever and a corresponding increased travel to connection 27 and rod 28. The other end of the rod 28 is connected with lever 30 comparatively close to its pivotal bearing 31, thereby also providing a comparatively greater range of movement at the outer end of said lever and its bearing-point 31. By this arrangement it will be seen that a very slight movement of tube 8 and its point 35 will be multiplied largely through the levers and connections as described and will impart a corresponding greater amount of inward travel to the plunger 15. It will be understood that the same arrangement of levers is provided at each end of the apparatus and that the oppositely-disposed plungers are adapted to operate simultaneously, although a single tube 8, a single leverage system and connections, with a single plunger and outlet-ports, may be provided and may be operated in substantially the same manner as the double construction.

The operation is as follows: When the apparatus is empty and connection with the train-supply system has supplied steam, it will pass from pipe 2 through nipple 6, T 5, and pipes 7 outwardly, escaping into the interior of tubes 8 near their outer extremities, thereby heating said tubes for their full length, the steam entirely filling the interior of the apparatus. The heat of the contained steam will immediately produce an elongation of tubes 8, producing movement of levers 24 and 30 and inward travel of plungers 15, thus cutting off the passage of steam outwardly through ports 12. As the steam condenses in the train-pipe the water will flow by gravity through the same connections, finally filling the interior of the casing and tubes 8. As the water cools the tubes 8 will contract in length, permitting reverse movement of the levers, thereby allowing the contained water under steam-pressure and with the assistance of spring 23 to force plungers 15 outwardly, so as to uncover ports 12, as shown in Fig. 2. When the water has drained through said ports so as to empty the trap, it will immediately be filled with live steam, again closing the ports as described, when the operation will be repeated.

It will be observed that means have been provided, as the securing-nuts for bolts 19, bearings 26, and the bearing 21, whereby the device may be very delicately and accurately adjusted, and that by reason of the leverage a very slight elongation of the tubes 8 will produce a correspondingly-increased movement of the plunger, so that the apparatus is very sensitive and subject to positive action under the temperature variations.

The entire apparatus is surrounded by an inclosing case 36, suspended from the car-frame by bolts and adapted to support the trap upon its bolts 19, which rest in suitable bearings in the case. This construction relieves the movable elements from any contact whatever, and it is designed that the case shall be tightly closed, so as to prevent the admission of foreign matter of any kind, likewise completely protecting the device from injury. It is comparatively simple in construction, effective in operation, and well adapted to the objects in view.

Changes and variations may be made in the design, construction, or details of the invention by the skilled mechanic; but all such are to be considered as within the scope of the following claims.

What I claim is—

1. In a water-trap, the combination of a fixed chamber provided with an inlet connection, an expansible tube connected therewith provided with a closed end, an outlet-port leading from the chamber, a movable port-controlling device, and connections between the exterior of said expansible element and the port-controlling device, substantially as set forth.

2. In a water-trap, the combination with a chambered body provided with an inlet connection, a valve-controlled series of outlet-ports, and an expansible hollow extension of the chambered body: of a spring-retracted controlling-valve, a depressing-lever therefor, a guide for the expansible extension, a lever-bearing, a lever engaging said bearing and the extension, and means connecting said lever with the controlling-valve lever, substantially as set forth.

3. The combination of a chamber provided with an inlet connection, oppositely-disposed expansible elements connected with the chamber, outlet-port, movable port-controlling devices, and connections between said expansible elements and the port-controlling devices, substantially as set forth.

4. The combination of a chamber provided with an inlet connection having oppositely-disposed distributing branches correspondingly-disposed expansible elements, inclosing said branches and connecting with the chamber, movable port-controlling devices, and connections between the expansible devices and the port-controlling devices, substantially as set forth.

5. The combination of a chamber provided with an inlet connection having therein a straining device, outlet-ports, oppositely-disposed expansible sleeves connected with the chamber and provided with bearing-terminals, oppositely-disposed branch pipes located within said sleeves and communicating with the inlet-opening, movable valve-controlling devices and actuating-levers for said valve-controlling devices operated by the expansible sleeves, substantially as set forth.

6. The combination of a chamber provided with an inlet connection provided with a straining device, outlet-ports, oppositely-disposed expansible sleeves connected with the chamber and provided with bearing-terminals, oppositely-disposed branch pipes located within said sleeves and communicating with the inlet-opening, movable valve-controlling devices, and actuating-levers for said valve-controlling devices operated by the expansible sleeves, with retracting-springs for the valve-controlling devices, substantially as set forth.

7. The combination of a chambered body having an inlet connection, oppositely-disposed expansible tubes communicating therewith, plunger-chambers provided with outlet-ports, plungers mounted therein, and levers adapted to actuate said plungers, with connections adapted to transmit movement from the expansible tubes to said levers, substantially as set forth.

8. The combination of a chambered body provided with a steam-inlet connection, oppositely-disposed communicating expansible sleeves provided with bearing-terminals, correspondingly-disposed branch pipes within said sleeves communicating with the steam-inlet, communicating plunger-chambers provided with outlet-ports, plungers adapted to control said ports, actuating-levers for the plungers, and levers actuated by the expansible sleeves, connected with said levers, substantially as set forth.

9. The combination of a chambered body provided with a sleeve-inlet connection, oppositely-disposed expansible sleeves connected with the chambered body, branch pipes terminating within said sleeves near their terminals and communicating with the steam-inlet, plunger-chambers provided with outlet-ports, valve-controlling plungers therein, retracting-springs, guiding cross-heads for the expansible sleeve connected with the body portion of the device, lever-bearings in said cross-heads, levers bearing therein and in engagement with the sleeve-terminals, and plunger-actuating levers, with intervening connections, substantially as set forth.

10. The combination with the expansible sleeve, of an interior inlet-pipe terminating near the terminal of the sleeve, substantially as set forth.

11. In a water-trap, the combination with a fixed chambered body provided with an inlet connection, a valve-controlled outlet-port, and an expansible hollow extension of the chambered body provided with a closed end: of a controlling-valve, an actuating-lever therefor, a guide for the expansible extension, a lever-bearing, a lever engaging said bearing and extension, and means connecting said lever with the valve-controlling lever, substantially as set forth.

In testimony whereof I affix my signature in presence of two witnesses.

ROBERT G. McAULEY.

Witnesses:
C. M. CLARKE,
JAS. J. McAFEE.